US011338210B2

(12) United States Patent
Benedetto et al.

(10) Patent No.: US 11,338,210 B2
(45) Date of Patent: May 24, 2022

(54) REMOTE NETWORKED SERVICES FOR PROVIDING CONTEXTUAL GAME GUIDANCE

(71) Applicant: Sony Interactive Entertainment LLC, San Mateo, CA (US)

(72) Inventors: Warren Benedetto, Foothill Ranch, CA (US); Landon Noss, Laguna Niguel, CA (US); Adil Sherwani, Oakland, CA (US); Nitin Mohan, San Francisco, CA (US); Matthew Ito, Walnut Creek, CA (US); Xifan Chen, Fremont, CA (US); Hugh Alexander Dinsdale Spencer, Solihull (GB); Paul Edridge, Hove (GB); Andrew John Nicholas Jones, London (GB); Simon Andrew St. John Brislin, Edinburgh (GB); Nicholas Anthony Edward Ryan, London (GB); Charles Wayne Denison, II, Piedmont, CA (US); Matthew Stewart Bloom-Carlin, San Francisco, CA (US); Derek Andrew Parker, San Francisco, CA (US)

( * ) Notice: Subject to any disclaimer, the term of this patent is extended or adjusted under 35 U.S.C. 154(b) by 0 days.

(21) Appl. No.: 16/653,462

(22) Filed: Oct. 15, 2019

(65) Prior Publication Data

US 2020/0122043 A1 Apr. 23, 2020

Related U.S. Application Data

(60) Provisional application No. 62/748,988, filed on Oct. 22, 2018.

(51) Int. Cl.
*A63F 13/85* (2014.01)
*A63F 13/79* (2014.01)
(Continued)

(52) U.S. Cl.
CPC ............ *A63F 13/85* (2014.09); *A63F 13/335* (2014.09); *A63F 13/35* (2014.09); *A63F 13/79* (2014.09); *H04L 67/38* (2013.01)

(58) Field of Classification Search
CPC .......... A63F 13/85; A63F 13/79; A63F 13/35; A63F 13/335; A63F 13/422; A63F 13/69; H04L 67/38
See application file for complete search history.

(56) References Cited

U.S. PATENT DOCUMENTS 6,352,479 B1 * 3/2002 Sparks, II ............... A63F 13/12
463/42
9,457,264 B1 10/2016 Chyou et al.
(Continued)

FOREIGN PATENT DOCUMENTS

CN 113272030 A 8/2021
CN 113272032 A 8/2021
(Continued)

OTHER PUBLICATIONS

"International Search Report" and "Written Opinion of the International Searching Authority," Patent Cooperation Treaty Application No. PCT/US2019/056346, dated Jan. 14, 2020, 9 pages.
(Continued)

*Primary Examiner* — Kevin Y Kim
(74) *Attorney, Agent, or Firm* — Carr & Ferrell LLP (57) ABSTRACT

Computer-implemented systems and methods for providing contextual game guidance are described herein. An example method includes determining based on contextual information regarding an application an objective of the user; automatically deriving based on the contextual information and the objective contextual guidance to assist the user; generating a user interface having the contextual guidance; and transmitting the user interface to a client device.

26 Claims, 8 Drawing Sheets

(51) Int. Cl.
  *H04L 67/131* (2022.01)
  *A63F 13/35* (2014.01)
  *A63F 13/335* (2014.01)

(56) References Cited

U.S. PATENT DOCUMENTS

| | | | |
|---|---|---|---|
| 2001/0016510 A1* | 8/2001 | Ishikawa | A63F 13/40 463/7 |
| 2002/0039952 A1* | 4/2002 | Clem | A63B 22/0242 482/8 |
| 2006/0046234 A1* | 3/2006 | Sperry | A63B 26/00 434/255 |
| 2011/0246621 A1 | 10/2011 | May, Jr. et al. | |
| 2012/0202594 A1 | 8/2012 | Bistis et al. | |
| 2013/0249947 A1 | 9/2013 | Reitan | |
| 2013/0260894 A1 | 10/2013 | Graf et al. | |
| 2014/0162780 A1 | 6/2014 | Suzuki | |
| 2014/0258469 A1 | 9/2014 | Maharajh et al. | |
| 2014/0278686 A1 | 9/2014 | Mullings et al. | |
| 2016/0255409 A1 | 9/2016 | Feldstein et al. | |
| 2017/0064014 A1 | 3/2017 | Nomura | |
| 2017/0087460 A1* | 3/2017 | Perry | A63F 13/25 |
| 2017/0259177 A1 | 9/2017 | Aghdaie et al. | |
| 2018/0365935 A1 | 12/2018 | Howell et al. | |
| 2020/0122031 A1 | 4/2020 | Sherwani et al. | |
| 2020/0139245 A1 | 5/2020 | Jarzebinski | |
| 2021/0213353 A1 | 7/2021 | Berg et al. | |

FOREIGN PATENT DOCUMENTS

| | | |
|---|---|---|
| WO | WO2020086338 A1 | 4/2020 |
| WO | WO2020086339 A1 | 4/2020 |

OTHER PUBLICATIONS

"International Search Report" and "Written Opinion of the International Searching Authority," Patent Cooperation Treaty Application No. PCT/US2019/056367, dated Jan. 13, 2020, 8 pages.

* cited by examiner

REMOTE NETWORKED SERVICES FOR
PROVIDING CONTEXTUAL GAME
GUIDANCE

CROSS REFERENCE TO RELATED APPLICATION

This application claims the benefit of U.S. Provisional Application No. 62/748,988, filed on Oct. 22, 2018.

FIELD

The present technology relates generally to remote networked game services, and more particularly to providing users with game guidance based on in-game context.

BACKGROUND

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

Video games are getting more complex, while the time allotted to play them is more limited than ever. Players want to stay engaged and immersed in the video games that they play, from start to finish. However, these players often have questions about the game that they are playing, and to get answers to these questions, they have to leave the game and engage with third party sites. This is because in-game states and video game activities are not aggregated and analyzed across video games and video game players. It would be a colossal amount of work for a game developer to implement all the features necessary to provide the player help with the game and to reduce player frustration within the context of a single game. Therefore, a data model and developer-friendly API is needed to support multiple players and gaming environments across a uniform data platform.

Moreover, players (users) can get stuck on games when they are unable to complete their immediate objective, which can lead to frustration and eventual churn from the game, and potentially, from the game platform as well. Traditionally, players may search for text and video walkthroughs though online websites, but this process has several pain points. In particular, searching online requires a player to put down the game controller to switch to another device, such as a phone, tablet, or laptop, and it requires multitasking between at least two screens (e.g., the video game on a TV screen and information associated with the video game on another screen). Moreover, it is not always obvious to the player what to search. Searching online for answers also requires the player to scan the resulting guide for the specific help that the player needs (which may be buried in a longer walkthrough or video), and it poses the risk of exposing the player to spoilers. Online results may be poorly written, inaccurate, out-of-date, or not relevant to the player's specific inquiry or in-game situation. Conventionally, help is not always easily available for brand new games, or for much older games or niche games, and help guides do not always have the same context as the player with respect to character builds, stats, weapons, loadout, or difficulty setting. Unfortunately, the player spends increasing amounts of time searching online for answers, instead of playing the game.

Thus, there is a long-felt need for an always-available, on-demand, spoiler-free system that provides highly contextual hints, guidance and solutions based on the player's specific in-game situation, to allow the player to quickly and painlessly try out better approaches and make progress in the game.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Generally, the present disclosure refers to a remote networked service for providing contextual game guidance. The remote networked service may be referred herein as a "help service" or a "help system," which is an alternative to traditional Internet searching for walkthroughs and videos, and provides real-time guidance. The guidance is based on user-specific information, such as the player's current activity, character build and statistics, inventory, abilities or moves, etc., or statistical analysis of the user relative to other users. As will be shown, the remote networked service simplifies and improves the process of getting help when stuck on a game, to reduce player churn and increase player playtime, satisfaction, and retention.

According to an example embodiment of the present disclosure, the user requests help with a game via a client device, such as a game console, personal computer, mobile device, etc., at various entry points or channels. Entry points may include a quick menu, game hub, voice interface, or other remote networked service. It is to be understood that the user may request help regardless whether or not the game is being played.

The remote networked service provides guidance based on in-game context. In various embodiments, the remote networked service has access to a uniform data system that provides a methodology for game clients and game servers to send data to the platform without requiring per-feature or per-service integration. The remote networked service has access to contextual information related to each game application for each user, including: any progression and activities, including names, descriptions, and statuses associated with each activity, and telemetry regarding start and end timestamps for an activity, estimated playtime, in-game location, and rewards; any actions and outcomes, including an initiator, a timestamp, and a location associated with each action and an impacted entity, a timestamp, a location, and a related action associated with each outcome; any zones and locations, including names, descriptions, virtual coordinates, and events associated with each zone and location; any characters and attributes, including character statistics, inventory, abilities, and telemetry regarding changes to character statistics, inventory, and abilities; any choices and branches, including dialog, path, options for each branching situation, and telemetry regarding a user encountering a particular branch and which option the user selected. Thus, the remote networked services of the present disclosure may provide guidance for each user for each game available based on user-specific, real-time, and in-game context.

According to another example embodiment of the present disclosure, the remote networked service determines, based on the contextual information, an objective for which the user needs guidance, and derives the guidance based on the contextual information and the objective. Examples of objectives include location-based objectives, such as finding an item, character, or place to progress to the next check-point; puzzle-based objectives, such as solving an in-game puzzle or breaking a code; objectives requiring tactical knowledge, such as knowing which in-game mechanism (e.g., moves, abilities, items, weapons, etc.) to utilize to successfully complete the objective; and objectives requiring mechanical knowledge, such as how best to execute an in-game mechanism (e.g., aiming, timing, positioning, etc.) to successfully complete the objective.

In general, the remote networked service may provide guidance based on the user's current activity, which may include a level, quest, trophy, multiplayer mode, etc. In addition, as will be discussed in greater detail below, the remote networked service may provide guidance based on any contextual information, and any combination of contextual information, accessible to the service—such as through the uniform data system.

In various embodiments, the remote networked service determines that the user requires location-based guidance to complete the user's current objective. For example, the remote networked service may determine that the user's current activity involves acquiring an item, interacting with a character, interacting with an object, or finding a place. In response, the remote networked service derives guidance indicating the location that the user needs to go to make progress in the current activity. The location may be based on statistical analysis of the user relative to other users completing the current activity with the same, or close to the same, character statistics, equipment, and skill.

In other embodiments, the remote networked service determines the user requires tactical guidance to complete their current objective. For example, the remote networked service determines, based on the contextual information, that the user is fighting an enemy that requires a particular in-game mechanism to be used to defeat that enemy. The guidance indicates the use of a particular game mechanism to increase the chance of success. The guidance may include the use of a particular ability or move (e.g., dodge, counter, attack, sprint), which may be potentially related to another entity's ability or move, such as dodging an enemy's attack. In another example, the guidance may include the use of a particular weapon, weapon-type, ammo-type, item, character, vehicle, damage-type, etc. In a further example, the guidance includes the recommendation of reaching a particular character level, statistic (stat), or strategy. The guidance may be based on statistical analysis of the user relative to other users who have completed the current activity with the same, or close to the same, character statistics, equipment, and skill.

In some embodiments, the remote networked service determines the user requires mechanical guidance to complete the user's current objective. For example, the remote networked service determines, based on the contextual information, that the user is fighting a boss enemy. The guidance indicates the best execution of a particular game mechanism to increase the chances of success, based on statistical analysis of the user relative to other users completing the current activity with the same, or close to the same, character statistics, equipment, and skill. For example, the guidance may include positional information, such as the best distance to maintain from an enemy; the best distance to maintain from an enemy when using a particular ability, move, weapon, weapon-type, or ammo type; best in-game locations at which to be positioned; or the best routes to take through the in-game world. In another example, the guidance may include timing information, such as the best timing of actions, abilities, or moves (which may or may not be relative to the timing of an enemy's move, for example), or the best timing of a first attack, first kill, or crossing of some other threshold. Other examples include the best speed or movement patterns to use, the best locations on an enemy to attack, and the best amount of an ability to use (e.g., whether to shoot in short bursts or brake around a corner while driving), etc.

It is to be understood that the various forms of guidance are not mutually exclusive. The remote networked service may provide one or more forms of guidance for any given context, as will be shown and described herein.

According to an aspect of embodiments disclosed herein, the remote networked service generates a user interface that provides users with the contextual guidance. Alternatively, the client device or a separate server may generate the user interface. For example, the client device running a game may generate the user interface providing the contextual guidance for the game. Alternatively or conjunctively, a separate device, such as a mobile device, may generate the user interface. The guidance may be in the form of text, image, video, audio, or a combination thereof. In certain embodiments, the remote networked service skips to a particular time stamp in a provided video, the time stamp being associated with the in-game context. For example, if a user is on the fifth level of a game, the remote networked service may present a video walkthrough of the game and automatically skip to a time stamp associated with the beginning of the fifth level, or some particular part of the fifth level at which the user is currently playing.

The remote networked service may determine an amount of guidance (e.g. a hint, a tip, an explicit video, etc.) to provide the user based on user preference, history of guidance provided to the user, or other suitable information.

The user interface may be presented via a number of client devices, such as a personal computer (PC), tablet PC, game console, gaming device, set-top box (STB), television device, cellular telephone, portable music player (e.g., a portable hard drive audio device), web appliance, or any machine capable of presenting the user interface. The user interface may be presented as part of a quick menu, game hub, other remote networked service, or audio interface.

According to a further example embodiment of the present disclosure, the user interface is updated in real-time. This allows the player keep the guidance "live" during gameplay. The remote networked service automatically refreshes content presented via the user interface based on real-time updates to user context and activity. This includes allowing the user to play the game while simultaneously watching a help video (either on a separate device or in a snap mode), with the video automatically pausing when it shows the necessary help clip, and then resuming when the user progresses to the next objective to show help for that objective.

The user interface may sort the guidance by likelihood to increase the user's chance of success. The order by which guidance is presented may be based on applied positive and negative weights, which are based on: help sourced from at least one user with a different skill level or same skill level; help sourced from at least one user with a different difficulty setting or same difficulty setting; help sourced from at least one user with different character statistics or equipment or same character statistics or equipment; source of help (e.g., users or developers); developer vote; user feedback; user success rate and speed of success after consuming guidance; video creator tags; or presence of offensive content.

According to an even further example embodiment of the present disclosure, the remote networked service may request users to publish user generated content (UGC) to be used as guidance. For example, for a particular in-game activity that the service does not have enough applicable help videos or content, the remote networked service may send a request to users that have successfully completed the in-game activity to publish a video of their gameplay.

In particular, the remote networked service may detect an event metadata that a particular user completed the in-game activity. In response to detecting the event metadata, the service may request the user to share a recording of the play session. In certain embodiments, the user may opt in and allow the remote networked service to associate videos with event and activity metadata and provide the videos to other users as guidance. The remote networked service may track a number of views or feedback for each video, and in some embodiments provide a reward to the user who generated the video based on a predetermined threshold of views or feedback. In other embodiments, the remote networked service may request and receive feedback from the user as to whether or not provided guidance was helpful.

BRIEF DESCRIPTION OF THE DRAWINGS

Embodiments are illustrated by way of example, and not by limitation in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents.

In general, various embodiments of the present disclosure are directed to providing users with guidance based on user-specific, real-time, in-game context.

Figure 1:
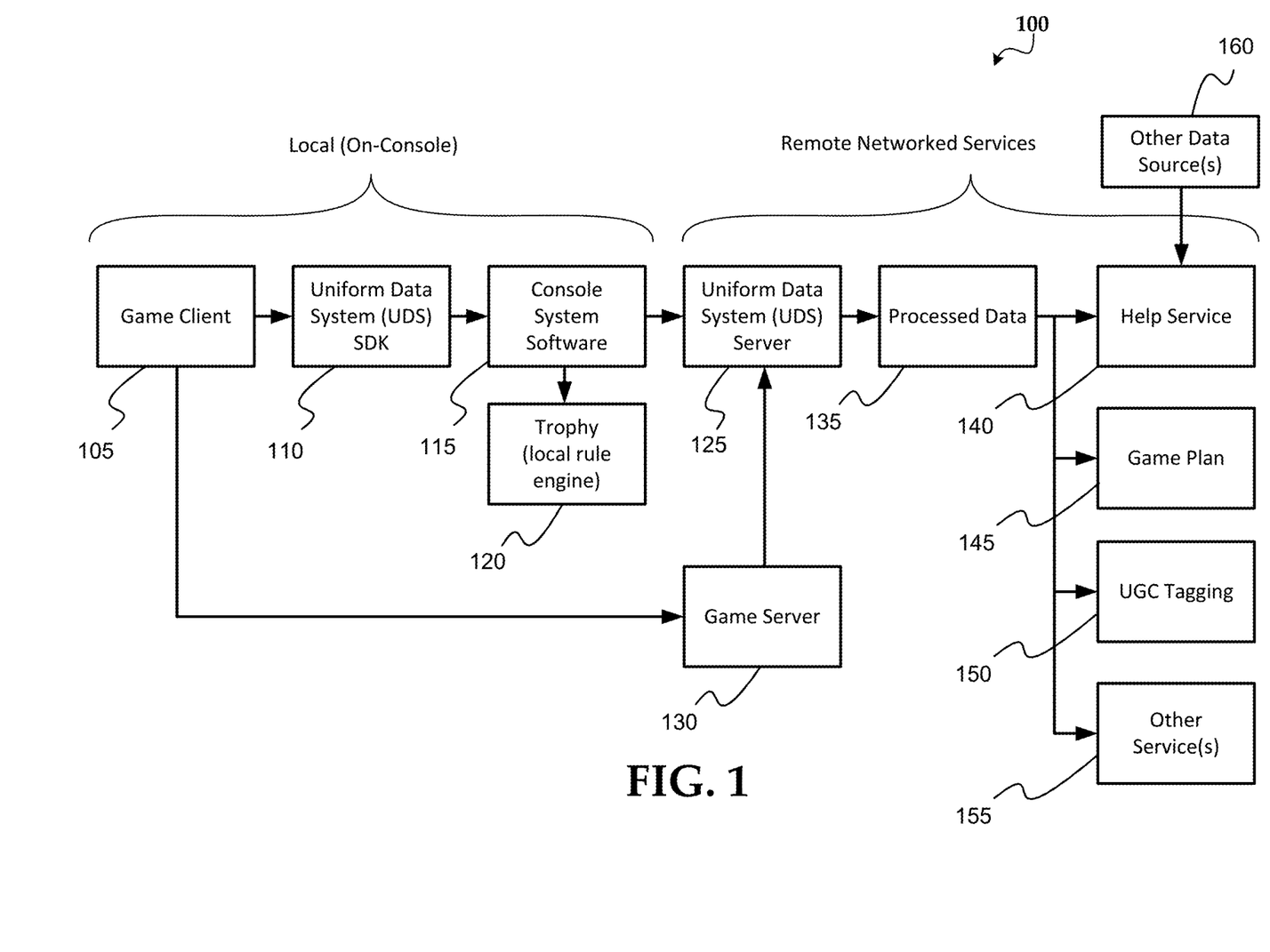
FIG. 1 shows an exemplary system architecture for providing users with contextual information regarding available game activities, according to one example embodiment.

FIG. 1 is an exemplary system architecture 100 for providing users with contextual information regarding available game activities, according to one example embodiment. In some embodiments, the exemplary system architecture 100 includes a game client 105, a uniform data system (UDS) software development kit (SDK) 110, console system software 115, a local rule engine 120, a UDS server 125, a game server 130, processed data 135, and one or more other remote networked services, including a help service 140, game plan 145, user generated content (UGC) tagging 150, and other service(s) 155. The help service 140 may also receive information from other data source(s) 160.

The game client 105 and game server 130 provide contextual information regarding a plurality of applications to a uniform data system (UDS) server 125 via a UDS data model describing the logical structure of UDS data used by the UDS SDK 110. The UDS data model enables the platform to realize remote networked services, such as the help service 140, game plan 145, UGC tagging 150, and other service(s) 155 that require game data, without requiring each game to be patched separately to support each service. The UDS data model assigns contextual information to each portion of information in a unified way across games. The contextual information from the game client 105 and UDS SDK 110 is provided to the UDS server 125 via the console system software 115. It is to be understood that the game client 105, UDS SDK 110, console system software 115, and local rule engine 120 may run on a computer or other suitable hardware for executing a plurality of applications.

The UDS server 125 receives and stores contextual information from the game client 105 and game server 130 from a plurality of applications. To be sure, the UDS server 125 may receive contextual information from a plurality of game clients and game servers for multiple users. The information may be uniformly processed (i.e. proceseed data 135) and then received by the plurality of remote networked services 140, 145, 150, and 155.

Figure 2:
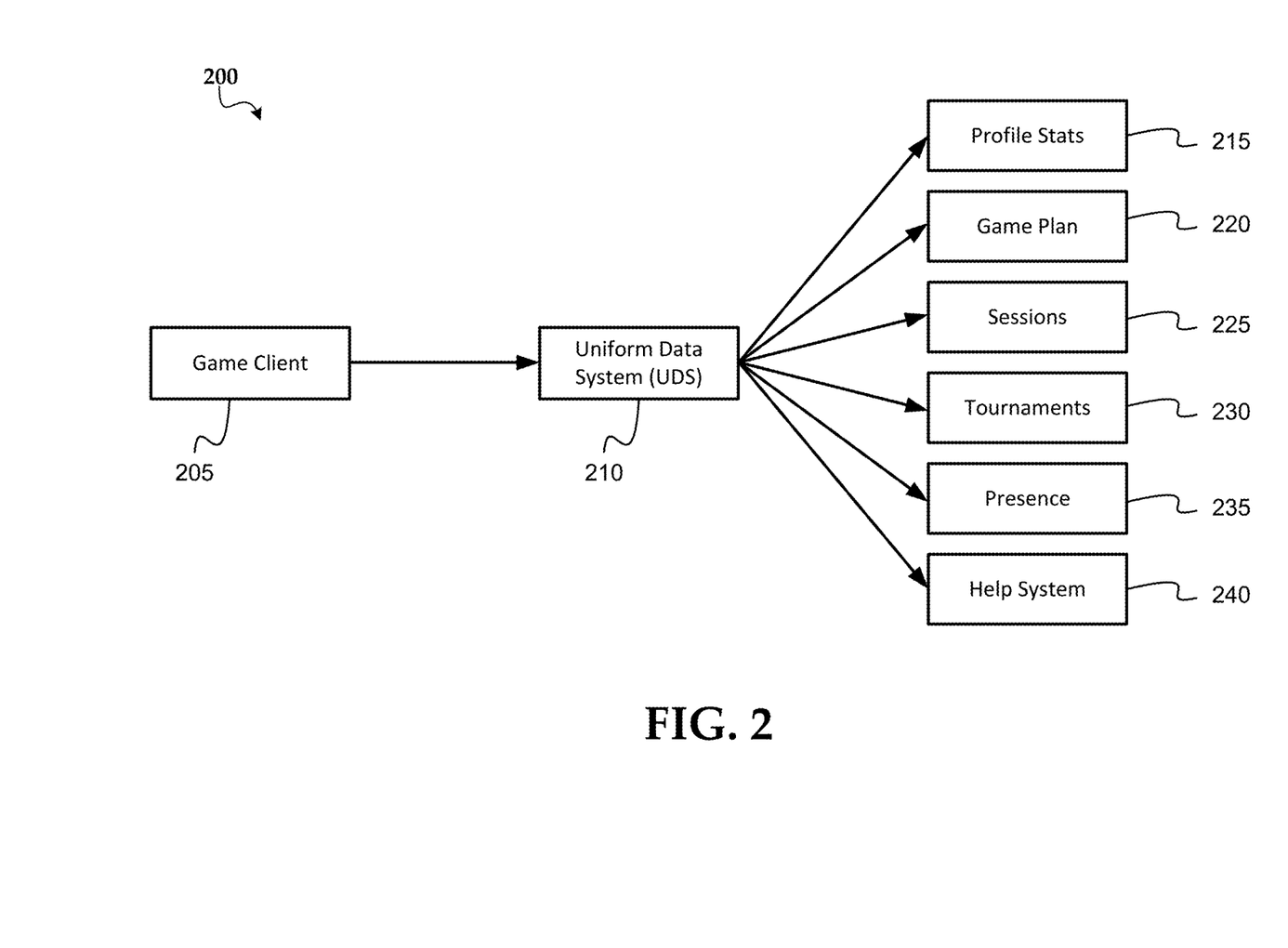
FIG. 2 illustrates another exemplary system architecture, according to one example embodiment.

FIG. 2 shows another exemplary embodiment of a system architecture according to the present disclosure. A game client 205 sends contextual information to a UDS server 210, which provides the contextual information in a unified data model to a plurality of remote networked services, including profile stats 215, game plan 220, sessions 225, tournaments 230, presence 235, and help system 240.

Figure 3:
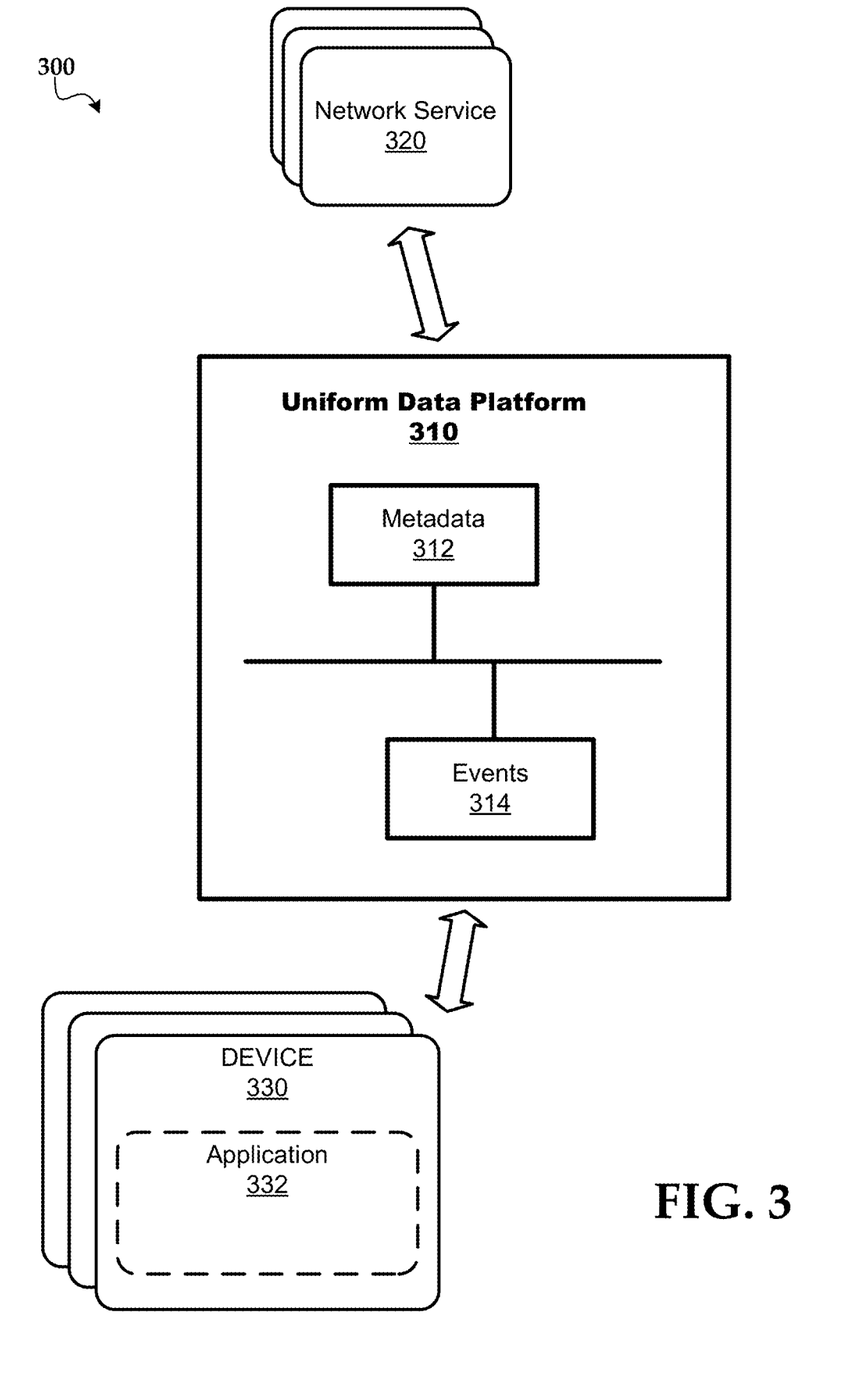
FIG. 3 shows an exemplary system for providing a data model for a uniform data platform, according to one example embodiment.

FIG. 3 illustrates an exemplary system for providing data model for a uniform data system 300, according to an example embodiment of the disclosure. In one example embodiment, system 300 can include at least one device 330 configured to execute at least one of a plurality of applications 332, each application having an application data structure. A uniform data platform 310 can be executed on one or more servers. The uniform data platform 310 can include a data model which is uniform across the plurality of application data structures. The data model can include metadata 312 corresponding to at least one object indicated in the data model, and events 314 corresponding to a trigger condition associated with at least one metadata entry. The values of the metadata 312 and events 314 can be associated with a user profile. The uniform data platform 310 can be configured to receive application data from the at least one device 330 and store the application data within the data model. The system 300 can also include a plurality of remote networked services 320 configured to access the application data from the uniform data platform 310 using the data model.

In various embodiments, the metadata 312 may include: a list of all activities that a user can do in an application, an activity name, a description of the activity, a state of the activity (whether available, started, or completed), whether the activity is required to complete an objective or campaign, a completion reward for the activity, an intro or outro cutscene, an in-game location, one or more conditions that must be met before the activity becomes available, and a parent activity that contains the activity as a sub-activity. Metadata 312 may further include: a list of abilities exercisable by the user, effects of each action, telemetry indicative of when actions and effects take place including corresponding timestamps and locations, an in-game coordinate system, a list of in-game branch situations, and telemetry indicative of when a branch situation is encountered and which option is selected by the user. A list of in-game statistics, items, lore, in-game zones and corresponding attributes regarding each statistic, item, lore, or zone may likewise be included in the metadata 312. In addition, the metadata 312 may indicate whether or not a particular activity, entity (such as a character, item, ability, etc.), setting, outcome, action, effect, location, or attribute should be marked as hidden.

Events 314 may be fired in response to several various trigger conditions. For example, such trigger conditions may include: an activity that was previously unavailable becomes available, a user starts an activity, a user ends an activity, an opening or ending cutscene for an activity begins or ends, the user's in-game location or zone changes, an in-game statistic changes, an item or lore is acquired, an action is performed, an effect occurs, the user interacts with a character, item, or other in-game entity, and an activity, entity, setting, outcome, action, effect, location, or attribute is discovered. The events 314 may include further information regarding a state of the application when the events 314 were triggered, for example a timestamp, a difficulty setting and character statistics at the time a user starts or ends an activity, success or failure of an activity, or a score or duration of time associated with a completed activity.

Figure 4A:
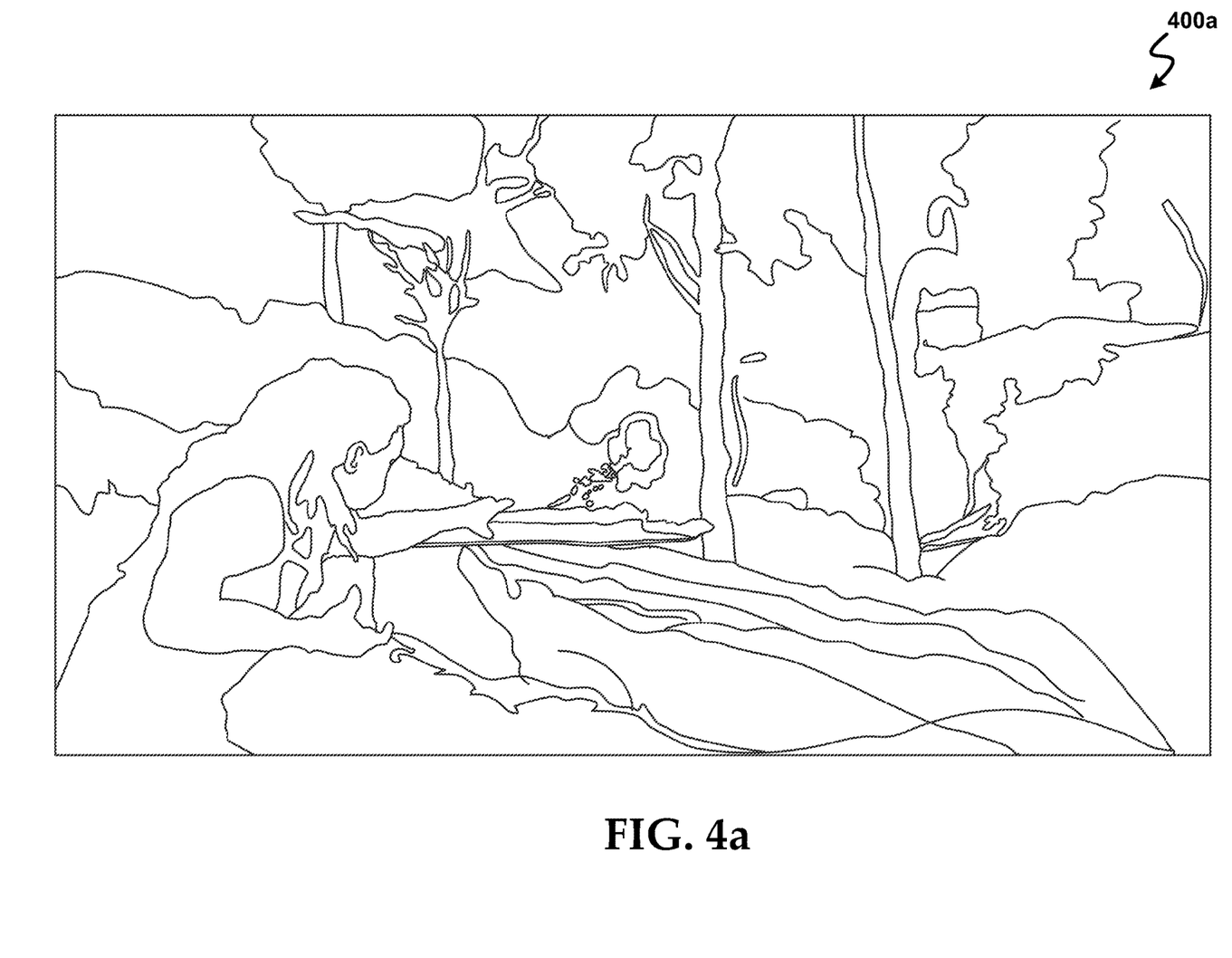
FIG. 4a shows an exemplary user interface, according to one example embodiment.
Figure 4B:
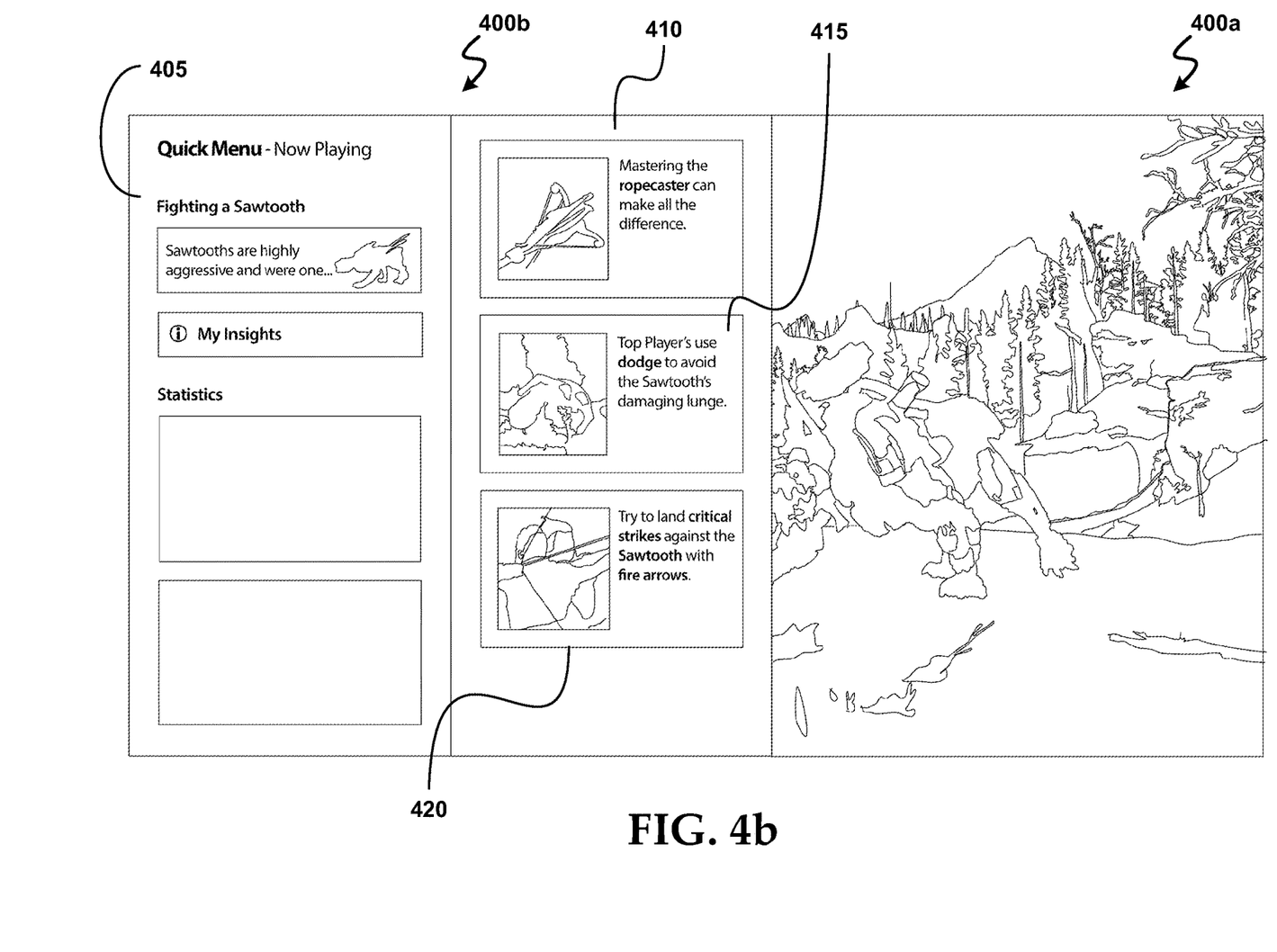
FIG. 4b illustrates another exemplary user interface, according to one example embodiment.

FIGS. 4a-4b illustrate exemplary user interfaces 400a, 400b for a remote networked service for providing contextual game guidance, according to the present disclosure. FIG. 4a depicts a user interface 400a that illustrates a screenshot from a game application being played by a user via a client device. In this example, the player character is fighting an enemy (i.e., Sawtooth), using a particular set of equipment (i.e., a green hunting bow and fire arrows). The client device may automatically send updates in real-time regarding the current activity and character information to the remote networked service, UDS server, or other suitable intermediary. For example, the current activity (i.e., "The point of the spear" quest having the objective, "Kill the Sawtooth") is displayed on the user interface 400a.

FIG. 4b shows an overlaid user interface 400b having contextual game guidance. In response to receiving a request for guidance from the user, the remote networked service generates a user interface 400b including context sensitive guidance and transmits the user interface 400b to the client device. Alternatively, the client device may generate the user interface 400b. The user interface 400b includes an indicator 405 that the remote networked system determined the activity currently engaged by the user (i.e., fighting a Sawtooth). The user interface 400b displays one or more cards 410, 415, 420 having relevant guidance information for the user's present objective. The remote networked service may determine that a particular use of a weapon, a particular mechanic or a type of ammunition (ammo) (e.g., the "ropecaster" shown in card 410 or landing critical strikes with fire arrows shown in card 420), statistically increases the chances of user success at defeating the Sawtooth. The user interface 400b displays the cards 410, 420 to the user, which may be selectable by the user to show more text or videos regarding the guidance. Selecting card 410 may cause the user interface 400b to show a video on how to best use the ropecaster.

Likewise, the remote networked service may offer text and video suggestions on how other players have successfully accomplished the objective. For example, the remote networked service may have previously determined that a second user successfully defeated the Sawtooth and used an in-game mechanism such as dodging to avoid a lunge attach of the Sawtooth. This may be represented in the UDS data model as an event action performed by the user which successfully avoided a lunge action by the Sawtooth enemy, actions which have associated time stamps. Here, the remote networked service may provide a video of the second user fighting the Sawtooth in card 415, and may time skip to a moment before the dodge action was executed.

Furthermore, in response to the user interacting with an in-game entity and receiving a request for guidance from the user, the remote networked service may provide, via user interface 400b, any collected lore or other discovered game objects that pertain to the in-game entity. In one or more embodiments, the discovered information presented to the user is distinguished from other contextual guidance.

It is to be understood that, while the guidance is described as being presented by "cards," any form of text, image, video, audio or other suitable media or graphic user interface may be used to display and organize the contextual game guidance.

Figure 5:
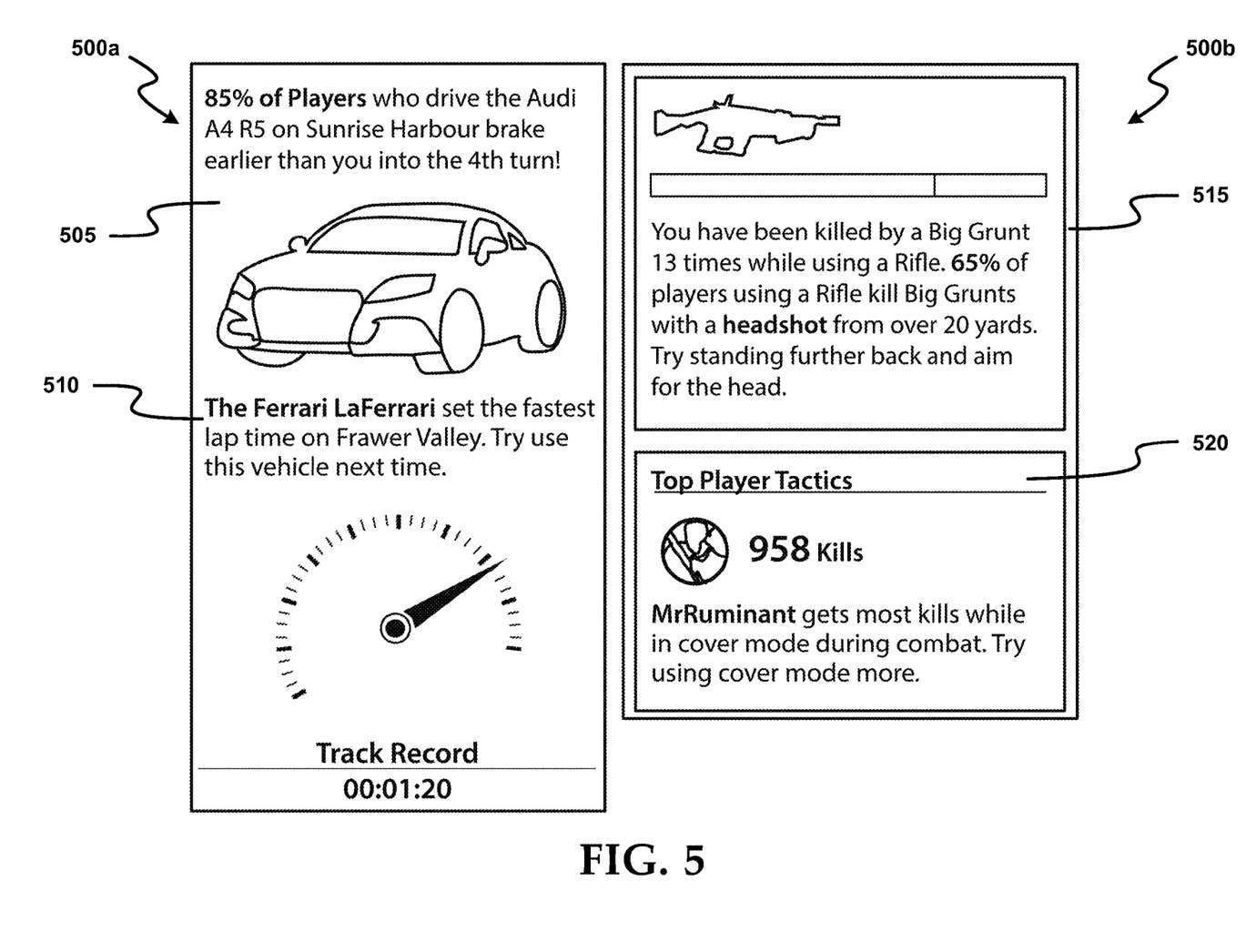
FIG. 5 depicts a further exemplary user interface, according to one example embodiment.

FIG. 5 illustrates another exemplary embodiment of user interfaces 500a, 500b of the present disclosure. In particular, user interfaces 500a, 500b depict further examples of contextual game guidance that may be presented to the user. Guidance 505, 510, 515, and 520 provides information to the user based on in-game context, present or past.

In a first exemplary user interface 500a, guidance regarding a racing game is presented. The UDS server may store user metadata regarding a race in a racing game, such as the car model the user selected, and the virtual location the user performed the brake action before the fourth turn of the circuit. The remote networked service, based on the UDS data, may determine statistics across users regarding particular races, car models, and levels of success, and present that information to the user. For example, if the user finished a race using the Audi A4 RS on the Sunrise Harbour track, the user interface 500 may inform the user via guidance 505 that 85% of players who drive the Audi A4 RS on Sunrise Harbour brake earlier into the fourth turn. If the user finished a race on the Fraser Valley track, the user interface 500 may include a guidance 510 suggesting the use of a different vehicle such as the Ferrari LaFerrari, which statistically has set the fastest lap time. It is to be understood that each piece of contextual guidance may have one or more associated conditions that must be met by a present context before being sent for display to the user.

In a second exemplary user interface 500b, guidance regarding a first or third person shooter is presented. Here, the remote networked service may count the occurrence of an event on the client device or the server and provide guidance in response to the count exceeding a predetermined threshold. For example, the remote networked service determines that the user has been killed by the enemy "Big Grunt" thirteen times while the user has been using a rifle, and presents mechanical-based assistance on how other players have defeated the enemy using the equipped weapon. Based on the UDS data across multiple users, the remote networked service determined that 65% of players using the rifle defeated the enemy with a headshot from a statistically-averaged distance. Additionally, the remote networked service may record a start time for an activity and check an elapsed amount of time the user has been attempting to complete the activity. In response to the elapsed amount of time exceeding a predetermined amount of time, the remote networked service may provide guidance associated with the activity. The guidance 515 is then presented to the user. The remote networked service may determine which players perform best, and present particular statistics regarding those top players and their tactics to the user. For example, guidance 520 informs the user that a particularly talented player gets most kills while in cover mode during combat.

If contextual guidance is not available when the user requests help, the user interface may include a notification that guidance is not available. For example, guidance may not be supported for a portion of a game or the game that the user is playing, or guidance might not exist for the section or context of the game the user is currently requesting help. The notification may include an explanation of why there is no provided contextual guidance.

According to an exemplary embodiment of the present disclosure, the remote networked service may provide a developer-facing web tool as a user interface to allow developers to monitor data-based tips and videos being surfaced by the system for each in-game activity. The user interface may include a list of in-game activities, and, for each activity, a list of the data-based tips and videos that would be provided to users if a request for guidance was sent regarding that activity. The list of data-based tips may be sorted by a determined confidence in the overall validity of the tip. The developer may up-vote or down-vote specific tips or videos using the user interface to influence the ranking of the tips or video in the results. Likewise, the developer may mark a tip or video for removal from the set of contextual guidance to be provided to users. The remote networked service may additionally receive requests from developers via the user interface.

The user interface may also allow the developer to provide guidance to be sent to the user upon a request for guidance for a particular activity. To facilitate, the user interface may provide the developer with a system tip template, including controls to specify whether or not a tip is applicable in a particular game, and to specify how the tip should be presented to users in the context of the game. In particular, the developer can include personalized tips and set what metadata conditions must be met by a determined context of the game before the tip is shown to the user. The template may include data-derived segments pulled from UDS data regarding the game, such as a list of applicable weapons or abilities available in a game.

Occasionally, a game patch or update can change the balance of weapons, characters, and abilities in a game, and thus change the effectiveness or applicability of certain guidance content. While the substance of the contextual guidance system may not necessarily be affected by such a game patch, the developer facing user interface may include a control for each tip template indicative of whether a subset of tips need to be updated or reset due to the particular game patch.

Each tip or piece of guidance may be associated with a help content identifier. A game engine may indicate via updating metadata or event information at the UDS server that the guidance associated with a help content identifier has been presented to the user in-game. The remote networked service, before sending contextual guidance information, may check to see whether the contextual guidance information has already been shown to the user based on the updated metadata and identifier information. In response to determining that the contextual guidance information has already been shown, the remote networked service may provide other, new contextual guidance instead.

Figure 6:
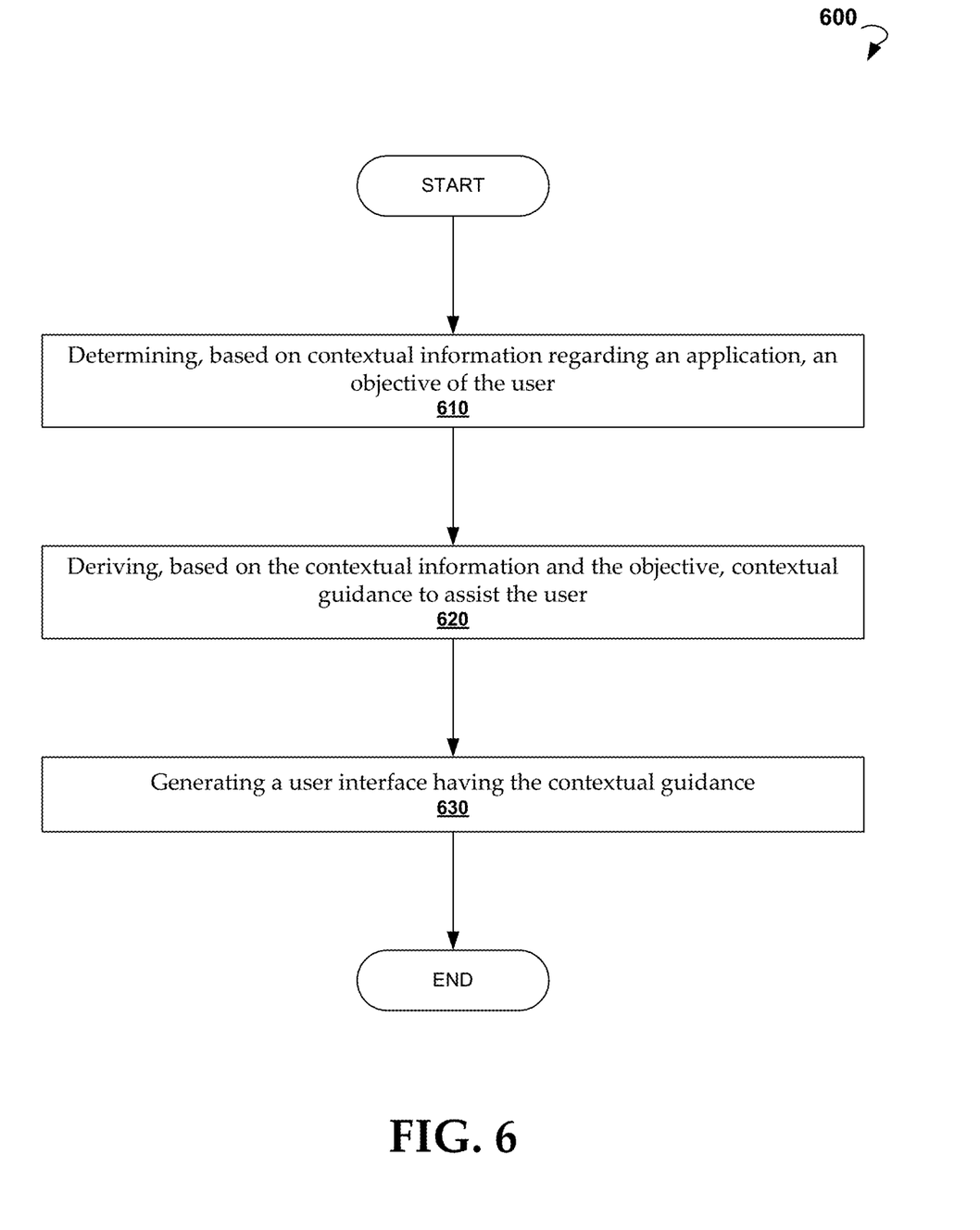
FIG. 6 depicts a flow diagram of a method for providing users with contextual information regarding available game activities.

FIG. 6 is a process flow diagram showing a method 600 for providing a game plan remote networked service, according to an example embodiment. Method 600 can be performed by processing logic that includes hardware (e.g., decision-making logic, dedicated logic, programmable logic, application-specific integrated circuit), software (such as software run on a general-purpose computer system or a dedicated machine), or a combination of both. In example embodiments, the processing logic refers to one or more elements of the system architecture 100 and 200 of FIGS. 1 and 2. Operations of method 600 recited below can be implemented in an order different than the order described and shown in the figure. Moreover, method 600 may have additional operations not shown herein, but which can be evident from the disclosure to those skilled in the art. Method 600 may also have fewer operations than shown in FIG. 6 and described below.

Method 600 commences at block 610 with determining, based on contextual information regarding an application, an objective of the user. Optionally, the method 600 may commence with receiving a user request for guidance from a client device. The contextual information may be received and updated in real-time while the application is being executed.

In block 620, the method 600 may include deriving, based on the contextual information and the objective, contextual guidance to assist the user. The contextual guidance may be based on statistical analysis of the user relative to other users that have completed the objective with one or more of the same character statistics, equipment, or skill as the user. The contextual guidance may be based on a level of guidance to provide to the user, the determination of the level provided based on how much guidance the user may need or desire.

In block 630, the method 600 may include generating a user interface having the contextual guidance. The contextual guidance may include text, images, videos, audio, or other suitable media. Videos presented via the user interface may include a starting time stamp at which to begin play of the video, wherein the method may further comprise determining the time stamp as associated with the current objective.

The contextual guidance may be sorted by a likelihood to increase the user's chances of successfully completing the objective. The sorting may use weights based on one or more of: data sourced from users with different skill level or same skill level; data sourced from users with a different difficulty setting or same difficulty setting; data sourced from users with different character statistics or equipment or same character statistics or equipment; source of data; developer vote; user feedback; user success rate and speed of success after consuming guidance. Data sourced from users with similar skill, settings, and character attributes will be more likely to help the present user accomplish his or her objective than data sourced from users with different context, and may be presented with a higher priority in the sorting. Thus, the weighted sorting increases the efficiency of providing the user with the contextual guidance.

Optionally, the method 600 may include transmitting the user interface to a client device. In certain embodiments, the user interface is updated in real time based on the present in-game context of the running application. The user interface may be transmitted to the same client device that is executing the application, or a separate client device. The user interface may then be presented to the user so that the user may receive highly customized and personalized guidance to their specific in-game situation and need.

Figure 7:
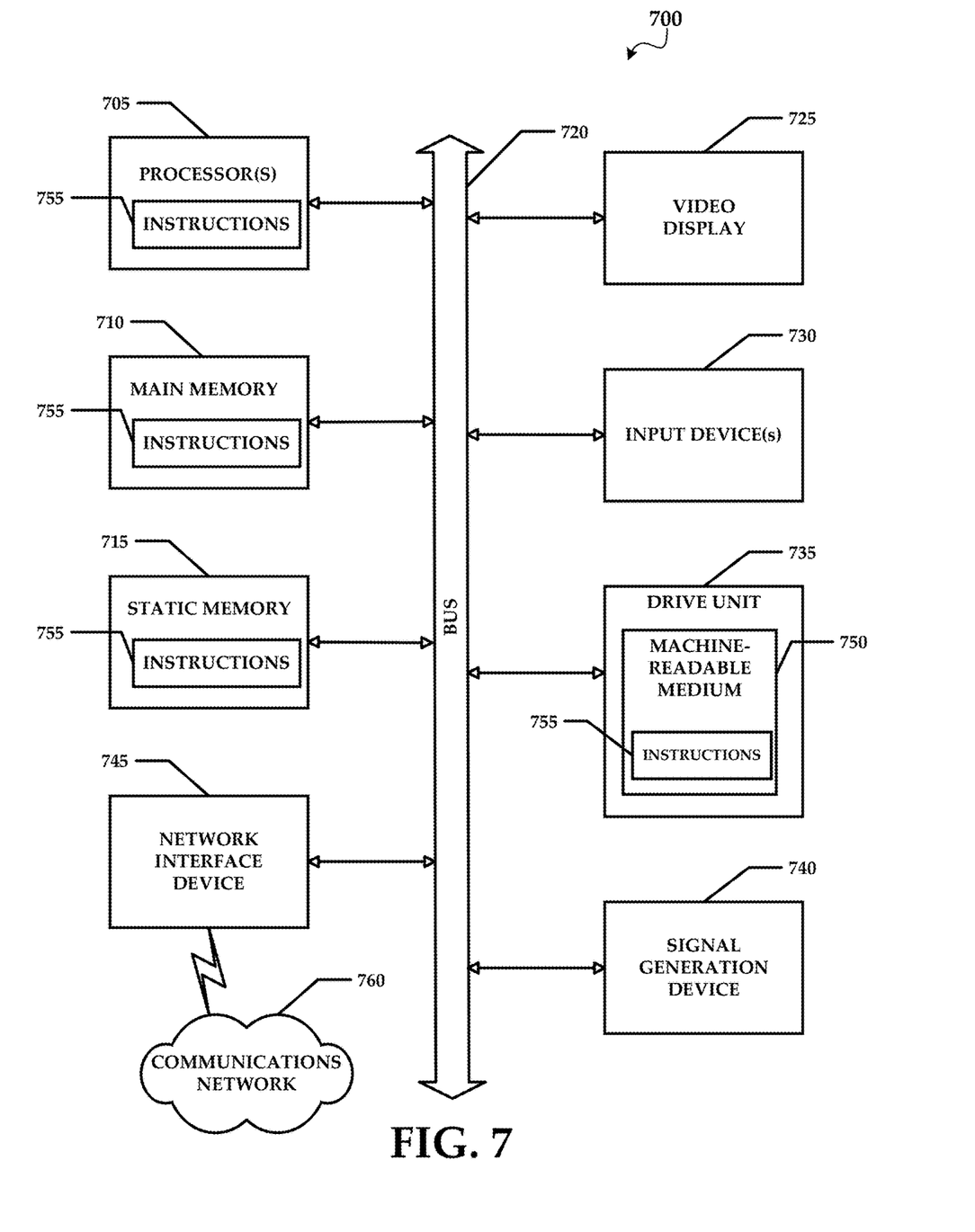
FIG. 7 is a diagrammatic representation of an example machine in the form of a computer system within which a set of instructions for the machine to perform any one or more of the methodologies discussed herein is executed.

FIG. 7 shows a diagrammatic representation of a computing device for a machine in the example electronic form of a computer system 700, within which a set of instructions for causing the machine to perform any one or more of the methodologies discussed herein can be executed. In example embodiments, the machine operates as a standalone device, or can be connected (e.g., networked) to other machines. In a networked deployment, the machine can operate in the capacity of a server, a client machine in a server-client network environment, or as a peer machine in a peer-to-peer (or distributed) network environment. The machine can be a personal computer (PC), tablet PC, game console, gaming device, set-top box (STB), television device, cellular telephone, portable music player (e.g., a portable hard drive audio device), web appliance, or any machine capable of executing a set of instructions (sequential or otherwise) that specify actions to be taken by that machine. Further, while only a single machine is illustrated, the term "machine" shall also be taken to include any collection of machines that separately or jointly execute a set (or multiple sets) of instructions to perform any one or more of the methodologies discussed herein. Computer system 700 can be an instance of at least a console (see e.g. FIG. 1), game server 130, or UDS server 125, for example.

The example computer system 700 includes a processor or multiple processors 705 (e.g., a central processing unit (CPU), a graphics processing unit (GPU), or both), and a main memory 710 and a static memory 715, which communicate with each other via a bus 720. The computer system 700 can further include a video display unit 725 (e.g., a Liquid-Crystal Display (LCD)). The computer system 700 also includes at least one input device 730, such as an alphanumeric input device (e.g., a keyboard), a cursor control device (e.g., a mouse), a microphone, a digital camera, a video camera, and so forth. The computer system 700 also includes a disk drive unit 735, a signal generation device 740 (e.g., a speaker), and a network interface device 745.

The drive unit 735 (also referred to as the disk drive unit 735) includes a machine-readable medium 750 (also referred to as a computer-readable medium 750), which stores one or more sets of instructions and data structures (e.g., instructions 755) embodying or utilized by any one or more of the methodologies or functions described herein. The instructions 755 can also reside, completely or at least partially, within the main memory 710 and/or within the processor(s) 705 during execution thereof by the computer system 700. The main memory 710 and the processor(s) 705 also constitute machine-readable media.

The instructions 755 can be further transmitted or received over a communications network 760 via the network interface device 745 utilizing any one of a number of well-known transfer protocols (e.g., Hyper Text Transfer Protocol (HTTP), CAN, Serial, and Modbus). The communications network 760 includes the Internet, local intranet, Personal Area Network (PAN), Local Area Network (LAN), Wide Area Network (WAN), Metropolitan Area Network (MAN), virtual private network (VPN), storage area network (SAN), frame relay connection, Advanced Intelligent Network (AIN) connection, synchronous optical network (SONET) connection, digital T1, T3, E1 or E3 line, Digital Data Service (DDS) connection, Digital Subscriber Line (DSL) connection, Ethernet connection, Integrated Services Digital Network (ISDN) line, cable modem, Asynchronous Transfer Mode (ATM) connection, or an Fiber Distributed Data Interface (FDDI) or Copper Distributed Data Interface (CDDI) connection. Furthermore, communications network 760 can also include links to any of a variety of wireless networks including Wireless Application Protocol (WAP), General Packet Radio Service (GPRS), Global System for Mobile Communication (GSM), Code Division Multiple Access (CDMA) or Time Division Multiple Access (TDMA), cellular phone networks, Global Positioning System (GPS), cellular digital packet data (CDPD), Research in Motion, Limited (RIM) duplex paging network, Bluetooth radio, or an IEEE 802.11-based radio frequency network.

While the machine-readable medium 750 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, random access memory (RAM), read only memory (ROM), and the like. Moreover, the phrases "at least one of A and B" or "one or more of A and B" is to be understood as a disjunctive list of non-mutually exclusive alternatives (i.e. A or B, or A and B).

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, XML, Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, C #, .NET, Adobe Flash, Perl, UNIX Shell, Visual Basic or Visual Basic Script, Virtual Reality Markup Language (VRML), ColdFusion™ or other compilers, assemblers, interpreters, or other computer languages or platforms.

Thus, the technology for remote networked services providing contextual game guidance is disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A computer-implemented method for providing contextual game guidance, the method comprising:
   determining, based on contextual information regarding an application, an objective of a user;
   determining one or more types of contextual guidance required by the user based on the user objective;
   deriving, based on the contextual information and the objective, the contextual guidance of the determined one or more types to assist the user, the contextual guidance including content derived from a database, the content being selected based on statistical data associated with a real-time in-game activity of the user;
   generating a user interface having the contextual guidance of the determined one or more types, the user interface being rendered on a client device;
   detecting an event metadata that the user has completed the objective; and
   transmitting, in response to the detecting, a request to share a recording of the application including successful completion of the objective.

2. The method of claim 1, further comprising receiving a user request for guidance from the client device.

3. The method of claim 1, further comprising receiving the contextual information in real time while the application is being executed.

4. The method of claim 3, further comprising updating the user interface in real time.

5. The method of claim 1, wherein the contextual guidance is based on statistical analysis of the user relative to other users that have completed the objective.

6. The method of claim 5, wherein the other users that have completed the objective had one or more same character statistics, equipment, or skill as the user.

7. The method of claim 1, further comprising sorting the contextual guidance by a likelihood to increase the user's chances of successfully completing the objective.

8. The method of claim 7, wherein the sorting uses weights based on one or more of: data sourced from at least one user with a different skill level; data sourced from at least one user with a different difficulty setting; data sourced from at least one user with different character statistics or equipment; source of data; developer vote; user feedback; user success rate; and speed of success after consuming guidance.

9. The method of claim 1, wherein the contextual guidance includes at least one of text, image, video, and audio.

10. The method of claim 9, wherein the contextual guidance includes a video, and the method further comprises determining a time stamp of the video associated with the objective, and skipping to the determined time stamp.

11. The method of claim 1, further comprising determining an amount of guidance to provide to the user, wherein the deriving the contextual guidance is further based on the amount of guidance to provide.

12. A system comprising:
    a processor; and
    a memory coupled to the processor and storing a program executable by the processor to perform a method for providing contextual guidance comprising:
      determining, based on contextual information regarding an application, an objective of a user;
      determining one or more types of contextual guidance required by the user based on the user objective;
      deriving, based on the contextual information and the objective, the contextual guidance of the determined one or more types to assist the user, the contextual guidance including content derived from a database, the content being selected based on statistical data associated with a real-time in-game activity of the user;
      generating a user interface having the contextual guidance of the determined one or more types, the user interface being rendered on a client device;
      detecting an event metadata that the user has completed the objective; and
      transmitting, in response to the detecting, a request to share a recording of the application including successful completion of the objective.

13. The system of claim 12, wherein the program is further executable to receive a user request for guidance from the client device.

14. The system of claim 12, wherein the program is further executable to receive the contextual information in real time while the application is being executed by a first client device, the first client device including the client device.

15. The system of claim 14, wherein the program is further executable to update the user interface in real time.

16. The system of claim 14, wherein the user interface is transmitted to the first client device and is configured to be displayed over the application window.

17. The system of claim 14, wherein the user interface is transmitted to a second client device separate from the first client device.

18. The system of claim 12, wherein the contextual guidance is based on statistical analysis of the user relative to other users that have completed the objective.

19. A non-transitory computer-readable storage medium having embodied thereon a program, the program being executable by a processor to perform a method for providing contextual guidance comprising:
    determining, based on contextual information regarding an application, an objective of a user;
    determining one or more types of contextual guidance required by the user based on the user objective, wherein the contextual guidance includes at least one of text, image, video, and audio;
    deriving, based on the contextual information and the objective, the contextual guidance of the determined one or more types to assist the user, the contextual guidance including content derived from a database, the content being selected based on statistical data associated with a real-time in-game activity of the user;
    if the contextual guidance includes a video, determining a time stamp of the video associated with the objective, and skipping to the determined time stamp; and
    generating a user interface having the contextual guidance of the determined one or more types, the user interface being rendered on a client device.

20. The system of claim 12, wherein the contextual guidance includes at least one of text, image, video, and audio, and if the contextual guidance includes a video, the method for providing contextual guidance further comprises determining a time stamp of the video associated with the objective, and skipping to the determined time stamp.

21. The non-transitory computer-readable storage medium of claim 19, wherein the program is further executable to receive a user request for guidance from the client device.

22. The non-transitory computer-readable storage medium of claim 19, wherein the program is further executable to receive the contextual information in real time while the application is being executed by a first client device, the first client device including the client device.

23. The non-transitory computer-readable storage medium of claim 22, wherein the program is further executable to update the user interface in real time.

24. The non-transitory computer-readable storage medium of claim 22, wherein the user interface is transmitted to the first client device and is configured to be displayed over an application window.

25. The non-transitory computer-readable storage medium of claim 22, wherein the user interface is transmitted to a second client device separate from the first client device.

26. The non-transitory computer-readable storage medium of claim 19, wherein the contextual guidance is based on statistical analysis of the user relative to other users that have completed the objective.

\* \* \* \* \*